(No Model.)

B. A. BULLOCK.
DEHORNER.

No. 601,996. Patented Apr. 5, 1898.

Witnesses
H. S. Dieterich
V. B. Hillyard

Inventor
Benoni A. Bullock
By his Attorneys,
C. A. Snow & Co.

UNITED STATES PATENT OFFICE.

BENONI A. BULLOCK, OF ELBA, MICHIGAN.

DEHORNER.

SPECIFICATION forming part of Letters Patent No. 601,996, dated April 5, 1898.

Application filed February 18, 1897. Serial No. 624,021. (No model.)

*To all whom it may concern:*

Be it known that I, BENONI A. BULLOCK, a citizen of the United States, residing in Elba township, in the county of Lapeer and State of Michigan, have invented a new and useful Dehorner, of which the following is a specification.

This invention relates to tools or implements for dehorning cattle and cutting the horn below the surface of the skin without injury to the surrounding flesh, the cutters being curved and relatively adjustable, so as to provide for taking up any looseness or wear incident to sharpening or from other causes, whereby a clean cut is effected upon bringing the cutters together.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
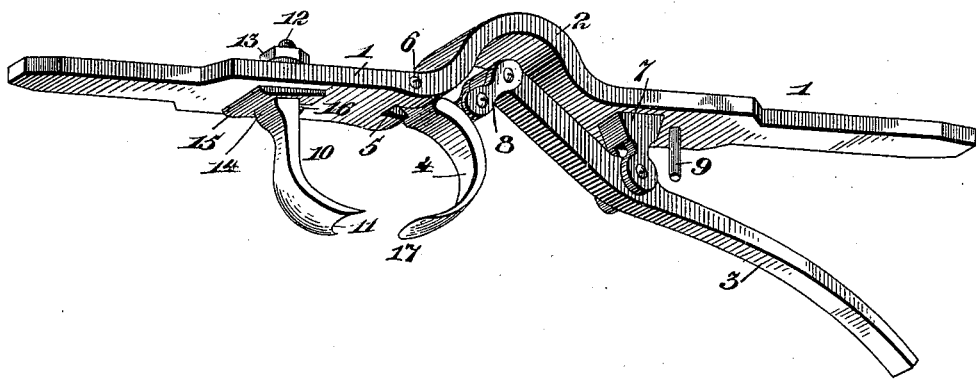
Figure 2:
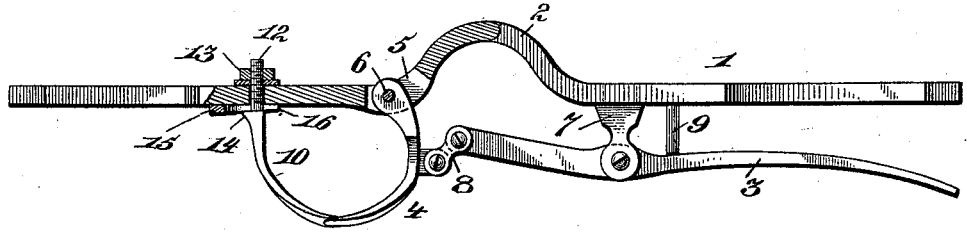
Figures 3, 4:
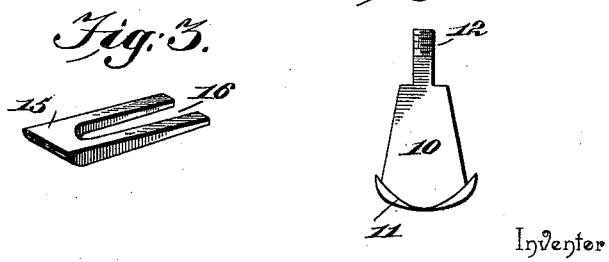

Figure 1 is a perspective view of a dehorner constructed after the manner of the present invention. Fig. 2 is a side elevation thereof, showing the cutters closed and having a portion of the stock broken away. Fig. 3 is a detail view of the adjusting-wedge. Fig. 4 is a front view of the adjustable cutter.

Corresponding and like parts are referred to in the following description and indicated in the several views of the drawings by the same reference characters.

The stock 1 is a bar reduced at its ends, forming handles to be grasped when operating the tool, and is formed intermediate of its ends with an arch 2 to provide clearance for the inner end of the operating-lever 3, by means of which the pivoted cutter 4 is actuated. A slot or opening 5 is formed in the stock at one end of the arch 2 and receives the inner or butt end of the cutter 4, which is mounted upon a pin 6, pivotally connecting the cutter 4 with the stock. This cutter curves throughout its length and has a curved cutting edge. The operating-lever 3 is fulcrumed to a stud 7, provided at the opposite end of the arch 2, and its inner end is connected with the cutter 4 by means of a link 8, the latter being loosely connected at its ends with the lever 3 and with a lug formed on the cutter 4. A pin 9 is located near the stud 7 and the outer portion of the lever 3 engages therewith and is limited thereby in its movement toward the stock, said pin acting in the capacity of a stop for the purpose specified.

A cutter 10, curved in an opposite direction to the cutter 4, has an approximately U-shaped notch in its active end, forming a cutting edge of corresponding shape, whereby a shear cut is effected upon bringing the cutters together. Moreover, this notch receives the horn and prevents any possible slipping of the tool when the latter is in operation. The cutter has a threaded stem 12, which passes through an opening in the stock and upon which is mounted a binding-nut 13 for securing the cutter in an adjusted position. A shoulder 14 is formed at the base of the threaded stem 12 and in the rear thereof and forms a brace to sustain the cutter when the tool is in operation. In order to secure a close fit between the active or cutting ends of the cutters the part 10 is made adjustable, a wedge 15 being provided and introduced between the shoulder at the base of the stem 12 and the opposing face of the stock 1. This wedge 15 has a slot 16 extending inward from its smaller end to afford clearance for the stem 12 and admit of the wedge being moved longitudinally to secure the desired adjustment of the cutter for the purpose specified.

The outer end of the lever 3 is heavier than the inner end, so as to gravitate and maintain the cutters in relative position for operation, as indicated in Fig. 1, and when applying the tool or implement the handle ends of the stock are grasped and the tool adjusted, so that the horn to be removed comes between the cutting edges of the parts 4 and 10, and sufficient pressure is exerted to press the cutting edges below the surface of the skin as far as possible, so as to remove the horn at or as near to the root as possible. After the tool has been properly adjusted the free end of the lever 3 is moved toward the stock, thereby bringing the edges of the cutters together and effecting the purpose of the tool.

The active or lower portions of the cutters are convex on their outer surfaces, thereby bringing the middle portion of the edges in a lower plane than the end portions, whereby the horn is scooped out. The edge 17 of the cutter 4 is convex to conform to the concavity of the edge 11, and the pivot 6 is so disposed that the cutters operate downwardly, then upwardly, whereby the horn is effectually removed.

Having thus described the invention, what is claimed as new is—

1. A dehorner comprising a stock, oppositely-curved cutters applied to the same side of the stock, the one being pivoted and the other adjustable by means of independent adjusting and securing devices, an operating-lever pivoted between its ends to the same side of the stock provided with the cutters, and a loose connection between the pivoted cutter and the operating-lever, substantially as set forth.

2. In a dehorner, the combination of a pivoted cutter, a second cutter having a stem and a bracing-shoulder at the base of the stem, a wedge interposed between the shouldered end of the adjustable cutter and its support, and means applied to the stem for securing the adjustable cutter in the required position, substantially as specified.

3. In a dehorner, a stock having an arch between its ends, coöperating cutters at one side of the arch, one of the cutters being pivoted to the stock at one end of the arch, and an operating-lever fulcrumed to the stock at the opposite side of the arch and having connection with the pivoted cutter, the arch affording clearance for the inner end of the said lever, substantially as specified.

4. A dehorner comprising a bar having a portion between its ends bent to provide an arch, a cutter pivoted to the bar at one end of the arch, a second cutter having a threaded stem passing through an opening in the bar and having a bracing-shoulder at the base of the stem, a slotted wedge interposed between the shouldered end of the adjustable cutter and the bar for properly positioning the cutter, securing means applied to the stem of the adjustable cutter for holding it in place, an operating-lever fulcrumed to a stud provided on the bar at the opposite side of the arch, a link connecting the inner end of the lever with the pivoted cutter, and a stop for limiting the inner movement of the lever, substantially as set forth.

In testimony that I claim the foregoing as my own I have hereto affixed my signature in the presence of two witnesses.

BENONI A. BULLOCK.

Witnesses:
JNO. ABBOTT,
E. T. SLAYTON.